United States Patent [19]

Hanni

[11] Patent Number: 5,223,011
[45] Date of Patent: Jun. 29, 1993

[54] AIR FILTER ASSEMBLY
[75] Inventor: Robert S. Hanni, Lomita, Calif.
[73] Assignee: Farr Company, El Segundo, Calif.
[21] Appl. No.: 942,964
[22] Filed: Sep. 10, 1992
[51] Int. Cl.$^5$ .............................................. B01D 46/12
[52] U.S. Cl. ....................................... 55/484; 55/493; 55/495; 55/497; 55/501; 55/502; 55/504; 55/509
[58] Field of Search ................. 55/484, 493, 495, 497, 55/499, 500, 501, 502, 504, 505, 506, 509

[56] References Cited

U.S. PATENT DOCUMENTS

| | | | |
|---|---|---|---|
| 2,966,959 | 1/1961 | Neumann | 55/509 X |
| 4,865,636 | 9/1989 | Raber | 55/484 |
| 5,080,699 | 1/1992 | Ho et al. | 55/495 X |

*Primary Examiner*—Charles Hart
*Attorney, Agent, or Firm*—Lyon & Lyon

[57] ABSTRACT

A filter assembly of the Vee-panel type comprising a filter frame and a plurality of complementary pairs of replaceable filter panels slidably disposed within the frame and defining a plurality of adjacent Vee's with the apexes of the Vee's being disposed adjacent the air outlet end of the assembly. The filter frame defines a plurality of rectangular perimeter panel retention surfaces thereon adjacent the sides of the filter panels for retaining the panels in place and forming an air tight perimeter seal therewith. A compressible gasket is disposed about each of the panel retention surfaces. An elongated cam surface is defined on at least one of the panels in each of the pairs of panels adjacent the air outlet end of the assembly such that upon sliding a panel into the frame such that the cam surface carried thereby is disposed adjacent the air outlet end of the assembly and then sliding the complementary panel into the frame, the complementary panel abuts and passes over the cam surface, forcing the panels outwardly apart against the adjacent panel retention surfaces and compressing the gasket therebetween. Locking clips are provided on said panels at the air inlet end of the assembly for releasably holding the panels in sealing engagement with the adjacent panel retention surfaces of the frame so as to form and maintain a perimeter compression face seal about and between each of the panels and the adjacent pane retention surfaces.

21 Claims, 3 Drawing Sheets

AIR FILTER ASSEMBLY

BACKGROUND OF THE INVENTION

The present invention relates to an air filter assembly of the multiple Vee-panel type. In such filter assemblies a plurality of pairs of relatively flat filter panels are angularly mounted in a support frame so as to define a corresponding plurality of adjacent Vees. The apexes of the formed Vees are disposed adjacent the air outlet end of the filter assembly and the open ends of the Vees define air inlets. Typically, a plurality of such filter assemblies are replaceably mounted in adjacent juxtaposition in a large master holding frame secured to a large air duct. In recent years, this multiple Vee-panel type air filter has become widely used in a wide variety of different applications due to the ability of the Vee-panel configuration to accommodate efficiently large volumes of different types of filter media with a minimum pressure drop across the filter assembly.

The individual filter panels in a multiple Vee-panel filter assembly are generally permanently mounted in the support frame due to the difficulty of obtaining an airtight seal between replaceable panels and the supporting frames at the rear end of the assembly. As a result, when the individual filter panels need replacement, it is necessary to remove and replace the entire filter assembly. This is not only costly, but replacement of the entire assembly also creates both handling and disposal problems due to the bulk of the support frame and the fact that many installations employ several such filter assemblies in the master holding frame. With the diminishing availability of landfill disposal sites, the problem of filter disposal will become increasingly acute.

In view of the above, it would therefore be desirable to develop a multi Vee-panel type air filter assembly which allows of individual panel replacement and thereby obviates the need to dispose of the panel support frame whenever the filter panels require replacement. To achieve widespread acceptance, such an assembly must be relatively inexpensive to manufacture, allow for easy replacement of the filter panels, and provide an airtight seal between the frame and the panels to prevent leakage. Such an assembly also should be capable of being manufactured in various sizes for different applications and for use with different types of filter media. The present invention provides such a filter assembly.

SUMMARY OF THE INVENTION

Briefly, the present invention comprises a multi Vee-panel type air filter assembly comprising a support frame and a plurality of pairs of flat rectangular filter panels. The filter panels are slidably mounted within the frame so as to define a corresponding plurality of adjacent Vees therein. Compressible sealing gaskets are disposed about open side portions of the frame to provide airtight perimeter compression seals between the frame and the outer sides of the filter panels. On of the panels in each of said pairs of panels defines an elongated cam surface extending vertically along a rear side portion thereof adjacent the inner rear edge of the panel. The cam surface is inclined rearwardly and inwardly within the frame upon the cam carrying panel being slid into position with the frame. As the complementary panel is slid into the frame so as to form a Vee with the first panel, the inner rear edge of the complementary panel abuts and slides over the cam surface on the first panel, forcing the two panels apart at the rear ends thereof such that they compress the adjacent portions of the sealing gaskets carried by the frame.

To complete and maintain the desired airtight compression seals between the support frame and the perimeters of the outer sides of the filter panels, a pair of locking clips are provided on each panel at or adjacent the forward ends thereof. The locking clips are adapted to releasably engage portions of the support frame upon the forward end portion of a filter panel being pressed outwardly against the frame, whereupon the sealing gasket is continuously compressed against the frame about the panel. To replace the filter panels in the frame, it is only necessary to disengage the locking clips from the frames withdraw the old panels, slide in the new panels and repeat the aforesaid camming and locking steps.

In an alternate embodiment of the present invention, each filter panel in the assembly is provided with an elongated cam surface adjacent the inner rear edge thereof. In this embodiment, the filter panels are installed and secured in the same manner as the prior embodiment except that either of the two complementary panels in each Vee can be pushed against and over the cam surface of the other panel thereby eliminating the need for two differently configured panels in each complementary pair of panels.

In a third embodiment of the present invention, the cam surfaces are carried by the filter frame and project forwardly from rear wall portions thereof between the apexes of each of the formed Vees. In this embodiment, a plurality of laterally spaced elongated camming members are affixed to the rear portions of the filter frame. Each member defines a forwardly projecting end, a pair of outwardly tapered cam surfaces extending rearwardly from the forward end and a pair of inwardly tapered panel retention surfaces extending rearwardly from the cam surfaces. As a filter panel is slid rearwardly within the frame, the inner rear edge thereof will abut and ride along one of the cam surfaces, forcing the rear portions of the panel outwardly and compressing the sealing gaskets on the adjacent portion of the filter frame. As the rear of the panel moves onto and along the panel retention surface of the camming member, the rear portion of the panel is aligned within frame and continuously urged by the panel retention surface against the sealing gasket to maintain the compression seal between the rear portion of the panel and the frame. The airtight compression seals between the frame and the perimeters of the outer sides of the filter panels are completed and maintained by the locking clips as in the prior embodiments.

It is therefore the principal object of the present invention to provide a multiple Vee-panel type air filter assembly having replaceable filter panels wherein the individual panels are maintained in a compression seal within the assembly to minimize air leakage.

It is another object of the present invention to provide such a filter assembly in which the filter panels ar easily replaced without the loss of the compression seal.

It is another object of the present invention to provide such a filter assembly which can be manufactured in various sizes and for use with different types of filtering media for a wide variety of air filtration applications.

It is yet another object of the present invention to provide such a air filter assembly which is of simple construction and economical to manufacture.

These and other objects and advantages of the present invention will become readily apparent from the following detailed description taken in conjunction with the accompanying drawings.

DESCRIPTION OF THE PREFERRED EMBODIMENTS IN THE DRAWINGS:

Referring now in detail to the drawings, the filter assembly 10 of the present invention comprises a support frame 12 and a plurality of filter panels 14. The filter panels 14 are disposed within the frame 12 so as to define a conventional multiple Vee configuration with each Vee being comprised of a complementary pair of panels 14' and 14", The number of pairs of such panels and the size of the frame can be varied for different installations. The most typical design would employ four pairs of complementary panels to define four adjacent Vees for a filter assembly 24 inches wide and 24 inches high. For the purpose of describing the present invention, an assembly 10 comprising two pair of complementary panels which would measure 12 inches wide and 24 inches high is illustrated in the drawings. In a typical installation, a plurality of filter assemblies 10 would be mounted in adjacent juxtaposition in a conventional master holding frame (not shown) secured to the inlet end of a large air duct such as those utilized in commercial heating, ventilating, and air-conditioning systems.

The support frame 12 of assembly 10 can be constructed of sheet metal or a suitable plastic material and is configured so as to define a plurality of pairs of vertically aligned tapered top walls 16 and tapered bottom walls 18, a corresponding plurality of elongated rear walls 20, a rectangular frame support 22 disposed at the forward ends of top and bottom walls 16 and 18 and a centrally disposed panel support member 24. In the four-panel configuration shown in the drawings, the support frame 12 defines two adjacent sets of top, bottom and rear walls 16, 18 and 20 with support member 24 being disposed therebetween. To accommodate additional filter panels for different applications, additional sets of top, bottom and rear walls could be added together with one or more support members 24 depending on the number of pairs of filter panels to be added.

Figure 4:
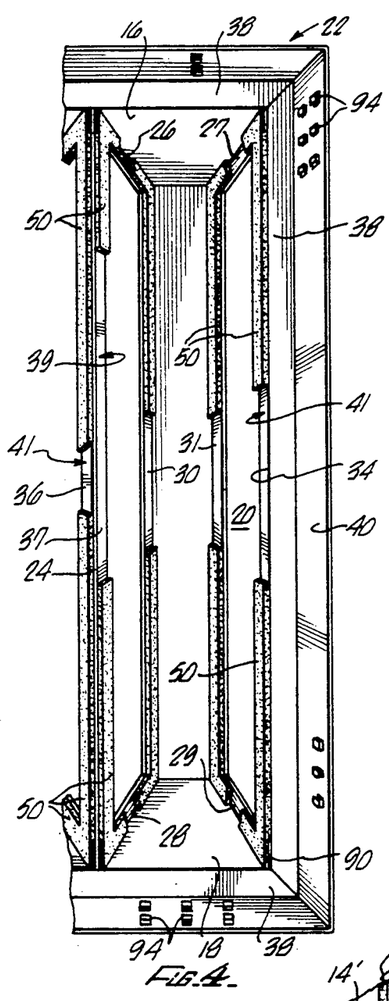
FIG. 4 is a partial front perspective view of the present invention.
Figure 5:
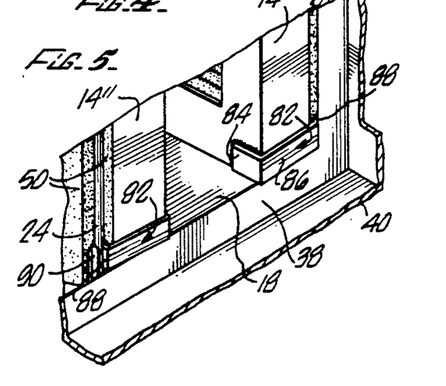
FIG. 5 is a partial perspective view of the present invention showing the use of the panel locking clips to secure the filter panels to the filter frame to complete the compression face seals therebetween.

Each aligned pair of tapered top and bottom frame walls 16 and 18 and the vertical end wall 20 extending therebetween are preferably of single piece construction and respectively define at their lateral ends, inwardly directed lateral panel retention flanges 26 and 27, 28 and 29 and 30 and 31, as seen in FIG. 4. In each of the two adjacent sets of aligned top, bottom and rear walls, flanges 26, 28 and 30 are coplanar and flanges 27, 29 and 31 are coplanar. The planes defined thereby are oppositely inclined with respect to the aligned central axes of the top and bottom walls 16 and 18 from which the flanges extend.

The rectangular frame support 22 is secured to and extends about the forward ends of top and bottom panel walls 16 and 18. Support 22 defines a pair of vertically disposed outer forward lateral panel retention flanges 34 (only one such flange being shown in FIG. 4), a flat forwardly facing rectangular surface 38 and a forwardly projecting rectangular surface 40 perpendicularly disposed with respect to surface 38. The centrally disposed panel support member 24 defines a pair of inner forward lateral panel retention flanges 36 and 37 (best seen in FIG. 3) and is secured to and disposed between the adjacent lateral panel retention flanges 27 and 26 at its upper end and flanges 29 and 28 at its lower end so as to extend vertically between the adjacent top walls 16 and bottom walls 18 of frame 12. The panel support member 24 is preferably Vee-shaped in cross section such that the inner panel retention flanges 36 and 37 defined thereby are oppositely inclined. The upper and lower end portions of support member 24 which are disposed between flanges 27 and 26 and 29 and 28 respectively are joggled inwardly so as to define four shallow slots 90 at the forward end of the frame (see FIG. 3), and to allow for the securement thereto of the end portions of flanges 26–30 such that flange 36 is coplanar with the panel retention flanges 27, 29 and 31 defined by the aligned set of top, bottom and rear walls disposed to the left side of member 24 and flange 37 is coplanar with the panel retention flanges 26, 28 and 30 defined by the set of aligned walls disposed to the right of the member 24 as illustrated in FIG. 4. The purpose of slots 90 will be discussed later herein.

Figure 1:
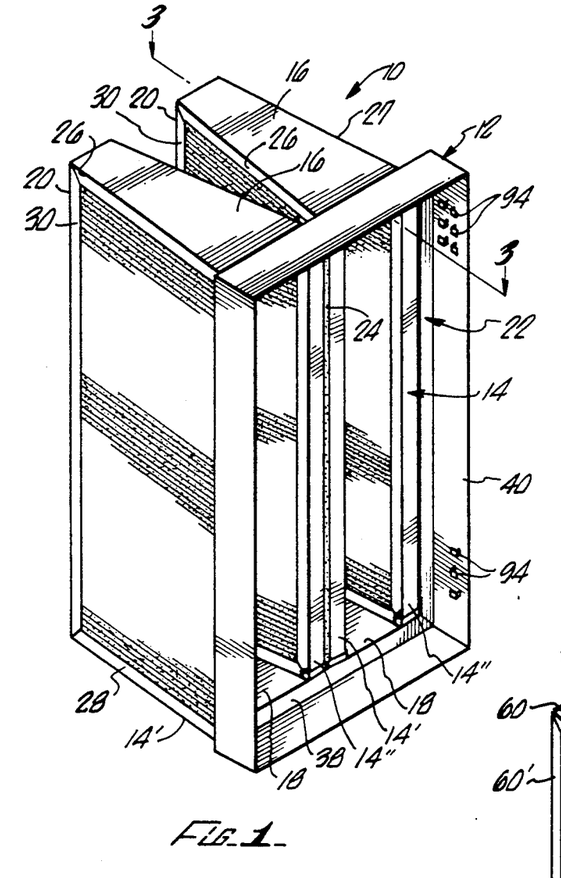
FIG. 1 is a perspective view of an air filter assembly of the present invention.
Figure 2:
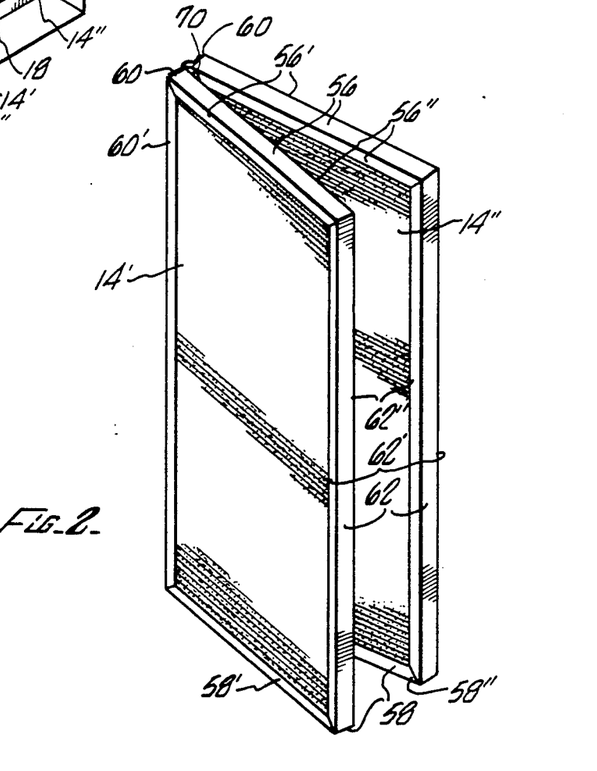
FIG. 2 is a perspective view of a pair of complementary air filter panels of the present invention.

Through the aforesaid configuration, the adjacent and coplanar panel retention flanges of support frame 12 thus define two rectangular and oppositely inclined lateral panel retention surfaces 39 and 41 for each set of aligned top, bottom and rear panel walls. For the aligned set of top, bottom and end walls shown in FIG. 4 (the right half of the filter assembly as seen in FIG. 1), the panel retention flanges 37, 26, 28 and 30 collectively define the left panel retention surface 39, and flanges 34, 27, 29 and 31 collectively define the right panel retention surface 41. For the other set of aligned walls (left half of the illustrated filter assembly), the left panel retention surface would be defined by coplanar flanges 34, 26, 28 and 30, and the right panel retention surface would be defined by coplanar flanges 36, 27, 29 and 31. As the filter assembly 10 is symmetrical about the central support member 24, only the right side thereof is shown in detail in FIGS. 3 and 4.

In a filter assembly of the present invention in which four complementary pairs of filter panels were employed, the filter frame would comprise four sets of aligned top, bottom and end walls 16, 18 and 20 and three central support members 24. As with the embodiment illustrated in the drawings, each of the four sets of aligned walls would define panel retention flanges which would cooperate with the flanges defined by the three central support members to define a pair of oppositely inclined lateral panel retention surfaces 39 and 41 for each set of aligned walls. The securement of each of the pairs of filter panels in such a frame would be no different from that described herein.

Figure 3:
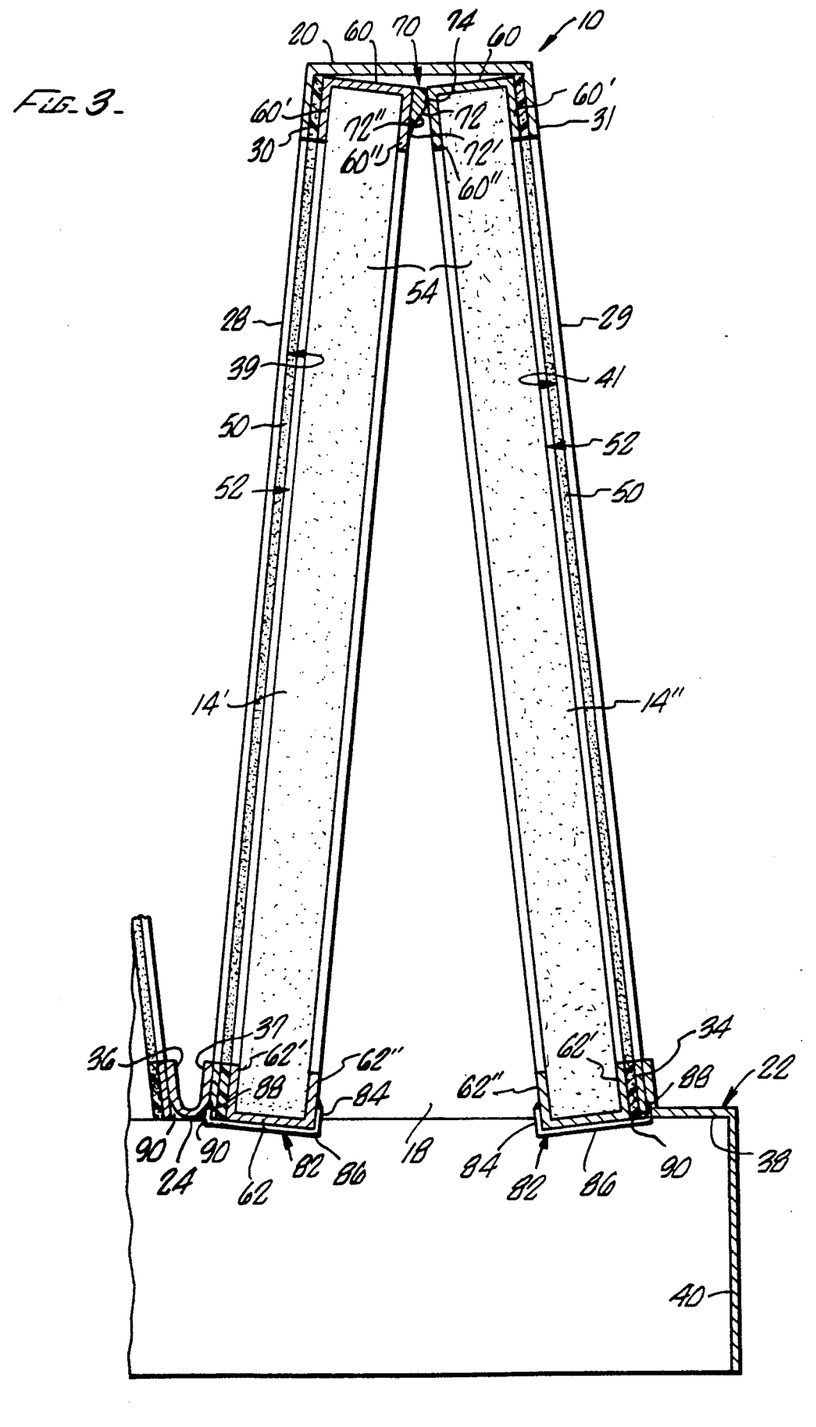
FIG. 3 is a sectional view taken along the line 3—3 in FIG. 1.

As seen in FIG. 3, complementary pairs of filter panels 14' and 14" are slidably disposed in adjacent Vee configurations between and adjacent each pair of aligned top and bottom walls 16 and 18. The outer side of filter panel 14' in each such pair is adjacent lateral panel retention surface 39 and the outer side of filter panel 14" is adjacent retention surface 41. To provide the desired airtight seal between the filter panels and the panel retention surfaces 39 and 41, strips of adhesive-backed HVAC open cell gasket material are secured to and extend along each of the panel retention surfaces to define sealing gaskets 50 between each of the panel retention surfaces 39 and 41 on the support frame 12 and the outer side walls of the filter panels.

The filter panels 14' and 14" each comprise a relatively flat, rigid, air impervious, rectangular frame 52 within which the filtering media 54 is retained. Frame 52 defines flat top and bottom panel walls 56 and 58 adapted to be disposed adjacent one of the aligned pairs of top and bottom walls 16 and 18 of the air filter assembly frame 12, a rear panel wall 60 and front panel wall 62. Panel walls 56-62 each define inwardly directed media retention flanges 56'-62' at the outer lateral edges thereof and media retention flanges 56"-62" at the inner lateral edges thereof for retaining the media within frame 52. While pleated paper wet-laid HEPA style filtering media is employed in the filter panels 14 illustrated in the drawings, numerous different types of filtering media could be employed in the filter assembly of the present invention for use in a wide variety of filtering applications. Regardless of the particular media employed and variations in the configurations of panel frames used to hold the media, it is important that the panel frames define a flat rigid outer perimeter side wall portion such as that defined by rigid flanges 56'-62' to obtain an airtight perimeter face seal between the outer side walls of the filter panels and the lateral panel retention surfaces 39 and 41 of the filter frame 12.

In order to obtain the desired seals between the filter panels and the support frame, it is necessary to maintain the sealing gaskets 50 disposed therebetween in continual compression. This is achieved in large part by a camming mechanism 70 which, when a complementary pair of filter panels 14' and 14" are slid into place within frame 12, forces the rear portions of the panels outwardly apart and against adjacent portions of the lateral retention surfaces 39 and 41, compressing the sealing gaskets 50 therebetween.

In the first embodiment of the invention illustrated in FIG. 1-4, the camming mechanism 70 comprises an elongated cam surface 72 carried by and extending along the inner media retention flanges 60' of filter panels 14' adjacent the rear walls 60 thereof. In this embodiment of the invention only filter panel 14' in each pair of complementary panels is provided with a cam surface 72. The cam surfaces 72 each preferably define a forward portion 72' which is slightly inclined outwardly and rearwardly with respect to the media retention flange 60" and merges smoothly into a steeper rearwardly inclined portion 72" which defines an angle of inclination of about 45 degrees with respect to flange 60". The rear portions 72" of the cam surfaces 72 each terminate substantially in a flat abutment surface 74 which extends parallel to flange 60' rearwardly to the rear wall 60 of the panel frame 52.

Figure 6:
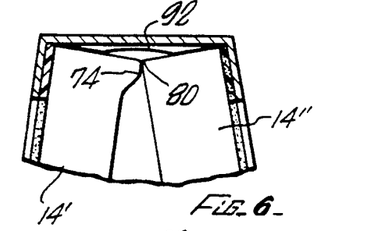
FIGS. 6a–6c are schematic representations illustrating operation of the camming mechanism of the air filter panels of the present invention.
Figure 6A:
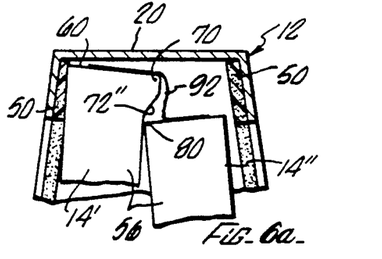
Figure 6B:
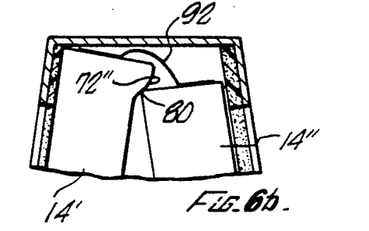

The operation of the camming mechanism 70 is illustrated in FIGS. 6a-6c. As illustrated therein, a pair of complementary filter panels 14' and 14" are slid into the filter frame 12 between an aligned pair of top and bottom frame walls 16 and 18 such that the cam surface 72 is disposed on the inner side of panel 14' and the steeply inclined portion 72" thereof is disposed rearwardly of the rear end wall 60 of panel 14" as seen in FIG. 6a. To assist the user in the proper alignment and installation of panels 14' and 14" within the support frame 12, a length of adhesive backed tape 92 can be secured to the rear walls 60 of the filter panels, as shown in FIGS. 6a-6c, which secures together the appropriately configured panels yet allows for limited separation of the panels so as not to interfere with the camming mechanism 72.

Panel 14' is then pushed to the rear of the filter frame 12 such that the rear panel wall 60 is disposed adjacent a rear wall 20 of the frame 12 and the outer media retention flanges 56'-62' of the panel are facing the lateral panel retention surface 39 of the filter support frame. As panel 14" is pushed rearwardly within the frame adjacent panel 14', the inclined lateral retention surface 41 of the frame directs panel 14" against panel 14' such that the rear inner edge 80 of panel 14" contacts the cam surface 72 on panel 14' and rides thereover as illustrated in FIG. 6b. As the inner rear edge 80 of panel 14" rides over surface 72", the rearward end portions of panels 14' and 14" are forced outwardly apart, compressing the adjacent portions of the sealing gaskets 50 between the panels and the adjacent lateral panel retention surfaces 39 and 41 on frame 12. When panel 14" is pushed to the rear of frame 12 adjacent end wall 20, the inner edge 80 of the panel is disposed on and bears against the flat abutment surface 74 on the camming mechanism 70, as seen in FIG. 6c, whereupon the forward portions of panels 14' and 14" can be secured in place to complete the sealing engagement of the panels to the frame.

To secure the forward portions of the filter panels in place against the panel retention surfaces and thereby complete the compression face seals about the filter panels, a pair of locking clips 82 ar secured to the forward ends of each of the filter panels proximate the upper and lower ends thereof. Clips 82 extend about the front walls 62 of the panel frames 52 and engage adjacent portions of the filter frame 12 upon the forward portions of the panels being pressed outwardly against the adjacent panel retention surfaces. By providing flat abutment surfaces 74 rearwardly of the relatively steeply inclined cam surfaces 72" on panels 14', panels 14" will each bear against a flat surface on one of the camming mechanisms when fully inserted into the frame, as apposed to an inclined surface, and thus will not tend to slide forwardly back down the cam surface which would destroy the compression seals between the panels and the frame.

To obtain fifty percent compression of the sealing gasket 50, the total offset of the camming mechanism 70 should be equal to the thickness of the sealing gasket 50. Increasing the offset will increase the compression. A fifty percent compression is believed suitable for most applications. Further, to avoid any lateral displacement of filter panel 14" before the panel has moved past the leading edge of the sealing gasket, the width of the steeply inclined surface 72" on camming mechanisms 70 should be less than the width of the sealing gasket.

In the embodiment of the invention shown in the drawings, the locking clips 82 define base portions 84 which are spot welded or otherwise secured to the inner media retention flanges 62" of the panel frames adjacent the upper and lower ends thereof (See FIG. 3). Spanning portions 86 are pivotally secured to the base portions 84 of the locking clips and project laterally across the front walls 62 of the panel frames and terminate in inwardly projecting locking portions 88. A plurality of locking clip receiving slots 90 are provided in the filter frame 12 which are adapted to receive the locking portions 88 of the locking clips. Four of such slots are defined by the joggled end portions of the central support member 24 as previously described and four additional slots 90 are defined by similarly joggling the upper and lower ends of the panel retention flanges 34 defined by the rectangular frame support 22.

The locking clips 82 are sized such that upon pressing the forward portions of the panel members outwardly against the adjacent lateral panel retention surface 39 or 41 on the frame and inserting the locking portions 88 of the clips into the receiving slots 90, the outer sides of the panel frames are pressed tightly against the adjacent lateral panel retention surfaces of the filter frame so as to compress the sealing gasket 50 therebetween, completing the perimeter compression face seal about and between the filter panels and the filter support frame To replace the filter panels 14 in filter assembly 10, it is only necessary to disengage the locking clips 82 from the frame, slide the panels to be replaced from the frame and insert the new panels as above described. The above recited camming and locking procedures are then repeated to seal the new panels within the frame. While the locking clips 82 alternatively could be carried by the filter frame 12 and secured to the respective filter panels 14, mounting the locking clips on the filter panels avoids the need for designing the locking clips for repeated use and eliminates the possibility of inadvertently puncturing the filter media with the locking portions 88 of the clips during panel installation. Similarly, the sealing gaskets 50 could be secured to and carried by the outer media retention flanges 56'-62' on the filter panels as opposed to the lateral panel retention flanges of the frame 12.

The filter assembly 10 could be utilized in an appropriately designed master frame without the need for the forwardly projecting rectangular surface 40 surrounding front frame surface 38 on the frame support 22. However, projecting surface 40 cooperates with surface 38 to provide a front housing for a pre-filter. A plurality of locking tabs 94 are preferably punched formed in surface 40 for releasable securement of conventional locking wires (not shown) for securing such a pre-filter in place within the front housing defined by the frame support 22.

Figure 7:
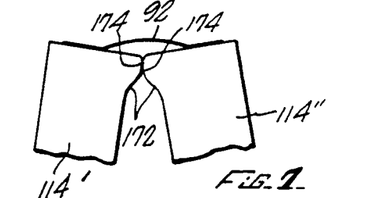
FIG. 7 is a partial top plan view of an alternate embodiment of the air filter panels of the present invention.

An alternate embodiment of the present inventions is illustrated in FIG. 7. As seen therein, this alternate embodiment differs from the prior embodiment of the invention in that both complementary filter panels 114' and 114" in each Vee define a cam surface 172 and an abutment surface 174 extending vertically along the inner rear media retention flanges of the panels. Cam surfaces 172 and abutment surfaces 174 are of the same configuration as the corresponding surfaces 72 and 74 on panels 14' of the prior embodiment. The mounting of filter panels 114 within the filter frame 12 is identical to the procedure described above with respect to panels 14' and 14" except that because cam surfaces 172 are provided on both panels, there is n sequential order in which the panels need be inserted into the frame. The rear inner edge of either panel can ride along the cam surface and onto the abutment surface of the other panel to effect the compression seal of the rear portions of the panels with the frame. This alternate embodiment obviates the need for two differently configured panel frames and thus somewhat simplifies manufacture and installation of the panels.

Figure 8:
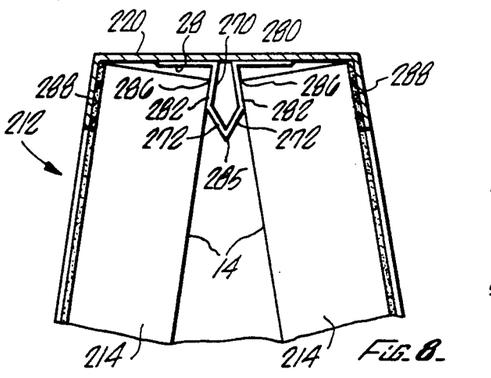
FIG. 8 is a partial sectional view of a third embodiment of the present invention.

A third embodiment of the invention is shown in FIG. 8. In this embodiment, the camming mechanism is carried by the filter frame 212 as opposed to being disposed on the filter panel frames as in the prior embodiments. As seen in FIG. 8, an elongated camming member 270 is centrally disposed on and carried by each of the rear walls 220 of the filter assembly frame 212. The camming members 270 (only one being shown) are preferably of single piece construction, are symmetrical about their central axes and define a pair of mounting flanges 280 at the base thereof which are spot welded or otherwise suitably secured to the rear frame walls 220. The camming members also define a pair of inclined panel retention surfaces 282 forwardly adjacent mounting flanges 280 and a pair of oppositely inclined cam surfaces 272 forwardly adjacent retention surfaces 282 and projecting rearwardly from the forward end 285 of the camming member.

As a filter panel 214 is slid rearwardly into position within the filter frame 212, the inner rear edge of the panel abuts one of the cam surfaces 272 defined by one of the camming members 270. Continued rearward movement of the panel causes edge 286 to move outwardly along the cam surface, forcing the rearward portion of the panel outwardly against the adjacent lateral panel retaining surface defined by the filter frame and compressing the sealing gasket 288 disposed therebetween. As the panel continues rearwardly into position, edge 286 slides past the camming surface 272 and onto the panel retention surface 282 of camming member 270. The panel retention surface 282 extends parallel to the oppositely facing lateral panel retention surface of the frame and is preferably spaced therefrom a distance equal to the combined thickness of the filter panel 114 and one-half of the thickness of the uncompressed sealing gasket 288. Accordingly, as the rear end portion of the filter panel moves rearwardly from the ca surface 272 onto panel retention surface 282, the retention surface both aids in aligning the rear portion of the filter panel within the frame and continually urges the rear portion of the panel against the panel retention surface so as to maintain the compression seal between the rear portion of the outer side of the panel and the panel retention surface. The securement of the front ends of the filter panels to the frame to complete the compression perimeter face seals between the panels and frame is achieved with the use of locking clips in the same manner as described above. It is to be understood that different configurations of camming members 270 could be employed to form and maintain the above-described compression face seals.

Various other changes and modifications may be made in carrying out the present invention without departing from the spirit and scope thereof. Insofar a these changes and modifications are within the purview of the appended claims, they are to be considered as part of the present invention.

I claim:

1. An air filter assembly of the multiple Vee-panel type having an air inlet end and an air outlet end, said assembly comprising:
   a filter support frame;
   a plurality of pairs of replaceable filter panels, said panels being disposed within said frame so as to define a corresponding plurality of adjacent Vees wherein the apexes of said Vees are disposed adjacent the air outlet end of said filter assembly;
   a corresponding plurality of camming means, one of said means being disposed between each of said pairs of filter panels at the apex of the Vee defined thereby for urging portions of said panels proximate said apexes into sealing engagement with said frame; and
   locking means disposed adjacent the air inlet end of said assembly for releasably holding portions of said panels in sealing engagement with said frame whereby a perimeter face seal about and between each of said panels and said frame is formed and maintained and, upon releasing said locking means, said panels can be removed from said frame for disposal and replacement.

2. The assembly of claim 1 including a plurality of compressible sealing gaskets disposed between lateral portions of said panels and said frame, said camming means and said locking means cooperating to maintain said sealing gaskets in compression between said panels and said frame so as to define a plurality of airtight seals therebetween.

3. The assembly of claim 2 wherein each of said filter panels includes rigid air impermeable side walls extending about perimeter portions of the opposite sides thereof and each of said camming means comprises an elongated cam surface carried by a rigid side wall of one of s id panels in each of said pairs of panels, said cam surface being inclined toward the other panel in each such pair, whereby upon sliding said one panel into said frame such that cam surface carried thereby is disposed adjacent the air outlet end of said assembly and sliding the other panel of said pair into said frame such that said other panel abuts and passes over said cam surface, said cam surface forces said panels outwardly against said frame and compresses the sealing gasket therebetween.

4. The assembly of claim 3 wherein said locking means comprises a plurality of locking clips carried by said filter panels and adapted to engage said frame, said clips releasably securing said panels against said frame and compressing said sealing gaskets between said panels and said frame.

5. The assembly of claim 2 wherein each of said filter panels includes rigid air impermeable side walls extending about perimeter portions of the opposite sides thereof and each of said camming means comprises a pair of elongated cam surfaces carried by adjacent portions of said side walls of said panels in each of said pairs of panels, the cam surface on each said panel being inclined toward the other said panel whereby upon sliding one of said panels into said frame such that the cam surface carried thereby is disposed adjacent the air outlet end of said assembly and sliding the other panel of said pair into said frame such that the cam surface on said other panel abuts and passes over the cam surface on said one panel, said cam surfaces force said panels outwardly against said frame and compress the sealing gasket therebetween.

6. The assembly of claim 5 wherein said camming means includes panel abutment surfaces rearwardly adjacent said cam surfaces thereon, said other panels in each of said pairs of panels bearing against and pivoting on one of said abutment surfaces upon passing over one of said cam surfaces and being pressed against said frame for securement thereagainst by said locking means.

7. The assembly of claim 2 wherein each of said filter panels includes rigid air impermeable side walls extending about perimeter portions of the opposite sides thereof and each of said camming means comprises a camming member mounted on said frame, said member defining a pair of oppositely disposed outwardly inclined cam surfaces and a pair of oppositely disposed inwardly inclined panel retention surfaces, each of said cam surfaces forcing on of said panels in each of said pairs of panels outwardly against said frame for compressing a sealing gasket therebetween upon said panel being slid thereover, and each of said retention surfaces aligning said panel with said frame and urging said panel outwardly against said frame upon said panel being moved from said cam surface onto said retention surface.

8. An air filter assembly of the multiple Vee-panel type having an air inlet end and an air outlet end, said assembly comprising:
   a filter support frame including a plurality of aligned top and bottom walls defining lateral ends tapering inwardly from the air inlet end of said assembly to the air outlet end thereof, a plurality of rear walls defining parallel lateral ends and extending between each of said pairs of aligned top and bottom walls at the air outlet end of said assembly, and a pair of perimeter panel retention surfaces extending along and between each of said pairs of top and bottom walls adjacent and parallel to said lateral edges thereof;
   a plurality of pairs of replaceable filter panels, each of said pairs being slidably disposed within said frame between one of said pairs of top and bottom walls and each of said panels within each of said pairs being laterally adjacent one of said panel retention surfaces so as to define a plurality of adjacent Vees within said frame wherein the apexes of said Vees are disposed adjacent said end walls of said frame;
   compressible sealing means disposed about each of said panel retention surfaces for forming an air tight perimeter face seal between said flange and one of said panels;
   a plurality of camming means, one of said camming means being disposed between each of said pairs of filter panels at the apex of the Vee defined thereby for urging portions of said panels proximate said ape outwardly into sealing engagement with portions of said panel retention surfaces, compressing said sealing means therebetween; and
   locking means disposed adjacent said air inlet end of said assembly and extending between said panels and said frames for releasably holding portions of said panels in sealing engagement with adjacent portions of said panel retention surfaces and compressing said sealing means therebetween whereby a perimeter face seal is formed and maintained about and between each of said panels and one of said panel retention surfaces and, upon releasing said locking means, said panels can be slidably removed from said frame for disposal and replacement.

9. The assembly of claim 8 wherein each of said filter panels includes rigid air impermeable side walls extending about perimeter portions of the opposite sides thereof and each of said camming means comprises an elongated cam surface carried by a rigid side wall of one of said panels in each of said pairs of panels, said cam surface being inclined toward the other panel in each said pair, whereby upon sliding said one panel into said frame such that said cam surface carried thereby is disposed adjacent the air outlet of said assembly and sliding the other panel of said pair into said frame such that said other panel abuts and passes over said cam surface, said cam surface forces said panel outwardly against adjacent portions of said panel retention surfaces and compresses said sealing means therebetween.

10. The assembly of claim 9 wherein said locking means comprises a plurality of locking clips carried by filter panels and adapted to engage said frame, said clips releasably securing said panels against said panel retention surfaces of said frame and compressing said sealing means between said side walls of said panels and said panel retention flanges.

11. The assembly of claim 10 wherein said camming means includes panel abutment surfaces rearwardly adjacent said cam surfaces thereon said other panels in each of said pairs of panels bearing against and pivoting on one of said abutment surfaces upon passing over one of said cam surfaces and being pressed against one of said panel retention surfaces for securement thereagainst by said locking means.

12. The assembly of claim 8 wherein each of said filter panels includes rigid air impermeable side walls extending about perimeter portions of the opposite sides thereof and each of said camming means comprises pair of elongated cam surfaces carried by adjacent portions of said side walls of each of said panels in each of said pairs of panels, said cam surfaces being inclined toward the other panel in each said pair, whereby upon sliding one of said panels into said frame such that the cam surface carried thereby is disposed adjacent the air outlet end of said assembly and sliding the other panel of said pair into said frame such that the cam surface on said other panel abuts and passes over said cam surface on said one panel, said cam surfaces force said panels outwardly against adjacent portions of said panel retention surfaces and comprises said sealing means therebetween.

13. The assembly of claim 12 wherein said locking means comprises a plurality of locking clips carried by filter panels and adapted to engage said frame, said clips releasably securing said panels against said panel retention surfaces of said frame and compressing said sealing means between said side walls of said panels and said panel retention flanges.

14. In an air filter assembly of the multiple Vee-panel type including a plurality of replaceable filter panels arranged in angularly disposed pairs within a support frame so as to define a plurality of adjacent Vee's with the apexes of the Vee's being disposed at the air outlet end of the housing and the open ends of the Vee's being disposed at the air inlet end thereof, the improvement comprising;

a pair of oppositely inclined perimeter panel retention surfaces defined by said frame laterally adjacent each pair of panels;

a compressible sealing gasket disposed about each of said panel retention surfaces;

an elongated cam surface disposed on one of said panels in each pair of panels adjacent the Vee defined thereby, said cam surface being inclined toward the other panel in said pair whereby upon sliding said one panel into the support frame such that said cam surface thereon is disposed adjacent the air outlet end of said assembly and subsequently sliding the other of said panels in said pair rearwardly within the frame, said other panel abuts and passes over said cam surface on said one panel, forcing said panels outwardly and compressing portions of said sealing gaskets between said panels and said panel retention surfaces; and locking means disposed at said air inlet end of said assembly for releasably holding portions of said panels in sealing engagement with said panel retention surfaces whereby a perimeter face seal is formed and maintained between each of said panels and one of said panel retention surfaces and, upon releasing said locking means, one or more of said panels can be removed from said frame for disposal and replacement.

15. The improvement of claim 14 including an elongated cam surface disposed on said other panel in each of said pair of panels, said cam surfaces being disposed adjacent to one of said cam surfaces on said first panel in each of said pairs and oppositely inclined with respect thereto.

16. The improvement of claim 14 including a panel abutment surface disposed rearwardly adjacent each of said cam surfaces, said other panel in each of said pairs of panels bearing against and pivoting on one of said abutment surfaces upon passing over one of said cam surfaces and being pressed against said frame for securement thereagainst by said locking means.

17. In an air filter assembly of the multiple Vee panel type including a plurality of replaceable filter panels arranged in angularly disposed pairs within a support frame so as to define a plurality of adjacent Vee's with the apexes of the Vee's being disposed at the air outlet end of the housing and the open ends of the Vee's being disposed at the air inlet end thereof, the improvement comprising;

a pair of oppositely inclined perimeter panel retention surfaces defined by said frame laterally adjacent each pair of panels;

a compressible sealing gasket disposed about each of said panel retention surfaces;

a plurality of spaced camming members carried by said frame adjacent the air outlet end of said assembly, each of said members projecting between one of the pairs of filter panels at the apex of the Vee defined thereby and defining a pair of oppositely inclined cam surfaces and a pair of oppositely inclined panel retention surfaces whereby upon sliding the filter panels into the support frame, the filter panels will each abut and slide along one of the cam surfaces defined by the camming member, forcing said panel outwardly and against one of said panel retention surfaces, compressing the sealing gasket disposed therebetween, and upon said panel being urged onto said panel retention surface, said retention surface aligns said panel within the frame and maintains said panel in sealing engagement with said panel retention surface; and locking means disposed at said air inlet end of said assembly for releasably holding portions of said panels in sealing engagement with said panel retention surfaces whereby a perimeter face seal is formed and maintained between each of said panels and one of said panel retention surfaces and, upon releasing said locking means, one or more of said panels can be removed from said frame for disposal and replacement.

18. An air filter assembly of the multi-Vee panel type having an air inlet end and inlet out end, said assembly comprising:
- a filter support frame defining a plurality of pairs of oppositely inclined panel retention surfaces;
- a corresponding plurality of pairs of replaceable filter panels, each of said panels defining a forward end and a rear end and each pair of said panels being adapted to be disposed within said frame between one of said pairs of panel retention surfaces such that the rear ends thereof ar disposed adjacent the air outlet end of said assembly;
- a plurality of compressible sealing gaskets, said gaskets being disposed between and about each of said panels and one of said panel retention surfaces;
- a plurality of cam surfaces, one of said cam surfaces being carried by at least one of said filter panels in each of said pairs of panels adjacent the rear end thereof, each of said cam surfaces being inclined toward the other panel in each of said pairs and toward the outlet end of said assembly for forcing the rear ends of said panels in each of said p irs outwardly apart and compressing portions of said sealing gaskets against said panel retention surfaces upon the other panel in said pair being urged rearwardly thereover; and
- locking means disposed at the inlet end of said assembly and cooperating with sid cam surfaces for releasably holding said panels in sealing engagement with said panel retention surfaces.

19. The filter assembly of claim 18 wherein a compressible sealing gasket is secured to and carried by each of said inclined panel retention surfaces.

20. The filter assembly of claim 18 wherein said locking means comprises a plurality of locking clips carried by said filter panels and adapted to engage said frames, said clips releasably securing said panels against said frame and compressing said sealing gaskets between said panels and said panels retention surfaces.

21. An air filter assembly of the multi Vee-panel type having an air inlet end and inlet out end, said assembly comprising:
- a filter support frame defining a plurality of pairs of oppositely inclined perimeter panel retention surfaces;
- a plurality of compressible sealing gaskets, said gaskets being disposed about and carried by each of said panel retention surfaces;
- a plurality of replaceable filter panels, each of said defining a forward end and a rear end and each pair of said panels being adapted to be disposed within said frame between one of said pairs of panel retention surfaces such that the rear ends thereof are disposed adjacent the air outlet end of said assembly;
- a plurality of elongated cam surfaces, one of said cam surfaces being carried by at least one of said filter panels in each of said pairs of panels adjacent the rear end thereof, each of said cam surfaces being inclined toward the other panel in each of said pairs of panels and toward the outlet end of said assembly, whereby upon sliding said one panel in each of said pairs of panels into the support frame such that said cam surface thereon is disposed adjacent the air outlet end of said assembly and subsequently sliding the other of said panels in said pair rearwardly Within the frame, said other panel abuts and passes over said cam surface, forcing the panels in said pair outwardly and compressing portions of said sealing gaskets between said panels and said panel retention surfaces; and
- a plurality of releasable locking clips extending between portions of each of said filter panels adjacent the forward ends thereof and said filter frame, said clips releasably securing said panels to said frame and cooperating with said cam surfaces to maintain said sealing gaskets in compression between said panels and said frame so as to define an airtight perimeter face seal between each of said panels and s id flange and allow for the removable of said panels from said frame for disposal and replacement.

* * * * *